United States Patent [19]

Tada et al.

[11] Patent Number: 5,044,346
[45] Date of Patent: Sep. 3, 1991

[54] FUEL ACTIVATION METHOD AND FUEL ACTIVATION DEVICE

[75] Inventors: Hideyo Tada, 1-43-2, Chuo, Kasukabe-shi, Saitama-ken; Hideaki Akuzawa, Urawa, both of Japan

[73] Assignee: Hideyo Tada, Japan

[21] Appl. No.: 567,695

[22] Filed: Aug. 13, 1990

Related U.S. Application Data

[63] Continuation of Ser. No. 344,003, Apr. 26, 1989, abandoned.

[30] Foreign Application Priority Data

Feb. 6, 1989 [JP] Japan .................................. 1-25881

[51] Int. Cl.$^5$ ............................................ F02M 33/00
[52] U.S. Cl. ..................................... 123/536; 123/538
[58] Field of Search ............... 123/549, 557, 536, 537, 123/538; 126/117

[56] References Cited

U.S. PATENT DOCUMENTS

| | | | |
|---|---|---|---|
| 4,387,690 | 6/1983 | Chiavaroli | 123/549 |
| 4,572,146 | 2/1986 | Grunwald et al. | 123/549 |
| 4,627,405 | 12/1986 | Imhof et al. | 123/549 |
| 4,713,524 | 12/1987 | Leo et al. | 123/549 |
| 4,715,325 | 12/1987 | Walker | 123/538 |
| 4,717,808 | 1/1988 | Cyll et al. | 123/549 |
| 4,721,846 | 1/1988 | Lupoli et al. | 123/549 |
| 4,756,294 | 7/1988 | Nakayama et al. | 123/549 |
| 4,766,878 | 8/1988 | Maruko | 126/117 |

FOREIGN PATENT DOCUMENTS 1232698  8/1959  France .

OTHER PUBLICATIONS

Patent Abstracts of Japan; vol. 5, No. 105 (M-077); 7/8/81, JPA-56-46,932; 4/28/81.
Patent Abstracts of Japan; vol. 12, No. 475 (M-774); 12/13/88, JPA-63-195,372; 8/12/88.
Patent Abstracts of Japan; vol. 13, No. 60 (M-796); 2/10/89, JPA-63-263-328.
Patent Abstracts of Japan; vol. 13, No. 349 (M-857); 7/31/89, JPA-01-116,275; 5/9/89.

*Primary Examiner*—Andrew M. Dolinar
*Assistant Examiner*—M. Macy
*Attorney, Agent, or Firm*—Jordan B. Bierman

[57] ABSTRACT

A fuel activation device comprising a container unit disposed in the fuel pipe introducing fuel into the combustion engine and a functional ceramic charged in the container unit capable of contacting with fuel passing through the container unit thereby activating the fuel to be efficiently combusted in the combustion engine.

2 Claims, 4 Drawing Sheets

FUEL ACTIVATION METHOD AND FUEL ACTIVATION DEVICE

This application is a continuation of application Ser. No. 07/344,003, filed 04/26/89, now abandoned.

FIELD OF THE INVENTION

This invention relates to a fuel activation method and a fuel activation device for activating liquid and gaseous fuels in internal combustion engines, external combustion engines and other apparatus using various types of fuels.

BACKGROUND OF THE INVENTION

In general, with fuels used in internal combustion engines, external combustion engines, and other combustion apparatus, exhaust gases are generated by combustion to release various types of noxious chemical substances into the atmosphere, thus causing an environmental pollution. These noxious chemical substances include, for example, CO, HC, NOx, and SOx.

Heretofore, to suppress generation of such noxious chemical substances, fuel combustion efficiency has been improved by improving the quality of fuels used or by improving various combustion devices. In addition, the exhaust gases released have been treated by a variety of exhaust gas removing devices using catalysts to prevent pollution.

However, such prior art methods have been insufficient to reduce pollutive substances, and the improvement of fuel quality has been difficult in view of the costs.

SUMMARY OF THE INVENTION

With a view to overcome such problems with the prior art methods, it is a primary object of the present invention to provide a fuel activation method and a fuel activation device which can enhance the fuel combustion efficiency and reduce concentrations of noxious exhaust gases.

In accordance with the present invention which attains the above object, there is provided a fuel activation method comprising causing a fuel to contact with a functional ceramic for activation of the fuel. There is also provided according to the present invention a fuel activation device comprising a container unit disposed in a fuel pipe to introduce a fuel into a combustion engine, and a far-infrared-radiant ceramic capable of contacting with the fuel passing through the container unit.

BRIEF DESCRIPTION OF THE DRAWINGS

These and other objects as well as advantages of the present invention will become clear by the following description of a preferred embodiment of the present invention with reference to the accompanying drawings.

DETAILED DESCRIPTION OF THE INVENTION

Figure 1:
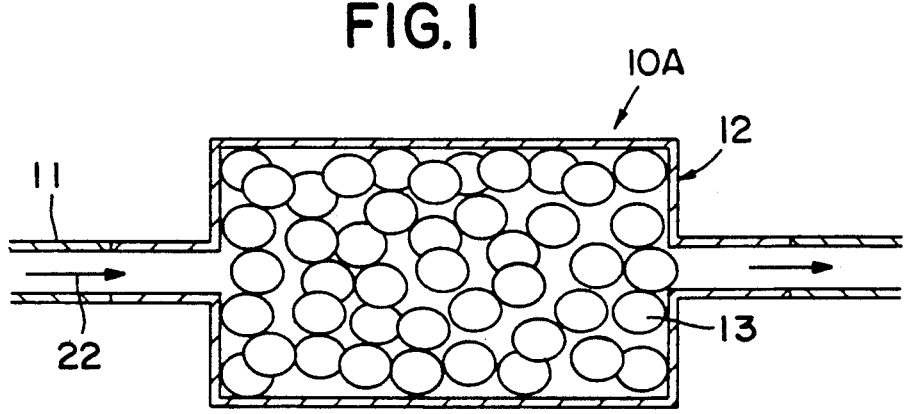
FIGS. 1 to 8 are schematic cross sectional views of embodiments of the fuel activation device according to the present invention.

A preferred embodiment of the present invention will now be described in detail. FIG. 1 is a schematic view of the fuel activation device according to the present invention. Referring to FIG. 1, this embodiment of the fuel activation device (hereinafter simply referred to as "activation device") 10A has a container unit 12 disposed in a fuel pipe 11 connecting a fuel tank and a carburetor, for example, of an internal combustion engine, and a granular far-infrared-radiant ceramic 13 as a functional ceramic charged in the container unit 12.

Figure 9:
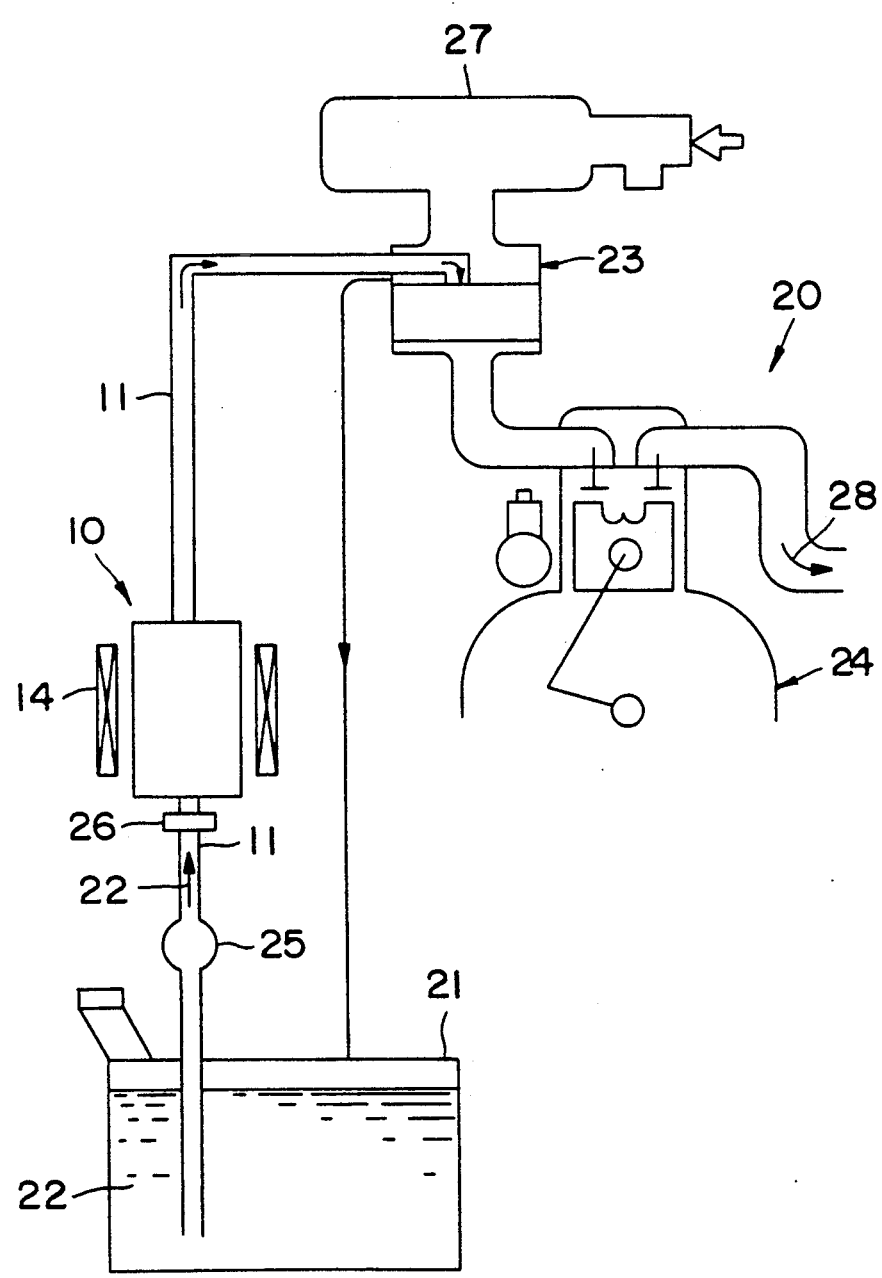
FIG. 9 is a schematic view of an internal combustion engine using the fuel activation device shown in FIG. 2.

More specifically, referring to FIG. 9, the activation device 10A indicated as 10 in FIG. 9 is disposed, for example, in the fuel pipe 11 to feed a fuel 22 from a fuel tank 21 to a carburetor 23 of an internal combustion engine 20, in which the fuel 22 passing through the activation device 10A is activated and efficiently combusted in a combustion chamber 24. Numeral 25 indicates a fuel pump to feed the fuel 22, numeral 26 indicates a fuel filter, numeral 27 indicates an air cleaner, and numeral 28 indicates exhaust gas.

With the above arrangement, as the fuel 22 passes through the activation device 10A, the fuel 22 absorbs far-infrared energy radiation of the far-infrared-radiant ceramic 13 charged in the container unit 12 to undergo high-value-added heating by far-infrared rays.

The far-infrared-radiant ceramic 13 includes known metal oxide ceramics such as $ZrO_2$, $SiO_2$, $Al_2O_3$, $Fe_2O_3$, $CaO$, $TiO_2$, $MnO$, $MgO$, and $BaO$, which may be used in adequately molded forms from granules or powders capable of efficiently radiating far-infrared rays.

This embodiment uses a far-infrared-radiant ceramic which, when heated, is capable of radiating large amounts of far-infrared rays, however, alternatively the present invention can use functional ceramics such as $ThO_2$, $ZrO_2$, $K_2O \cdot nTiO_2$, $BeO$, diamond, WC, TiC, $B_3C$, SiC, $Si_3N_4$, $Ca_5(F,Cl)P_3O_{12}, nAl_2O_3$, and ferrite to activate fuels.

Figure 2:
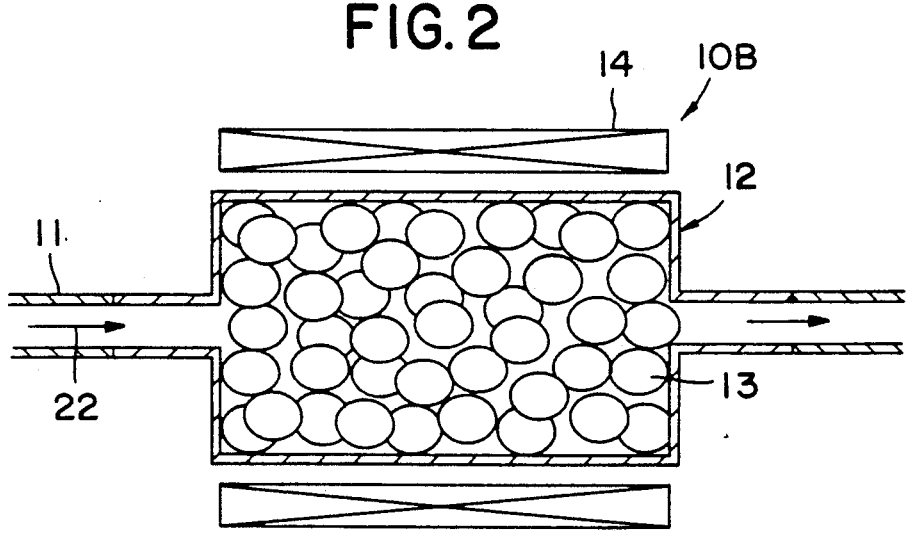

Next, another preferred embodiment of the present invention will now be described in detail. FIG. 2 is a schematic view of this embodiment of the fuel activation device. Referring to FIG. 2, this embodiment of the activation device 10B has a container unit 12 disposed in a fuel pipe 11 connecting a fuel tank and a carburetor, for example, of an internal combustion engine, a granular far-infrared-radiant ceramic 13 as a functional ceramic charged in the container unit 12, and heating means comprising a heating unit 14 disposed to cover the outer periphery of the container unit 12 for transmitting heat to the far-infrared-radiant ceramic 13 in the container unit 12. The heating means is to heat the fuel-activating far-infrared-radiant ceramic 13 and the fuel and, for example, may be one which raises the temperature of the ceramic 13 to a value higher by only 1° C. than the fuel temperature.

The activation device 10B, as in the case of the previous embodiment, is disposed, for example, in the fuel pipe 11 of the internal combustion engine 20 shown in FIG. 9 to activate the fuel 22. With the above arrangement, as the fuel 22 passes through the activation device 10B, the far-infrared-radiant ceramic 13 is further activated by the function of the heater 14 as heating means to emit large amounts of far infrared energy, thereby enabling high-value-added heating by far-infrared rays of the fuel 22 and enhancing the combustion efficiency in the combustion chamber 24.

Now, other embodiments of the activation device will be described with reference to FIGS. 3 to 9. The same components as used in the activation devices 10A and 10B are indicated by the same reference numbers and not described again.

Figure 3:
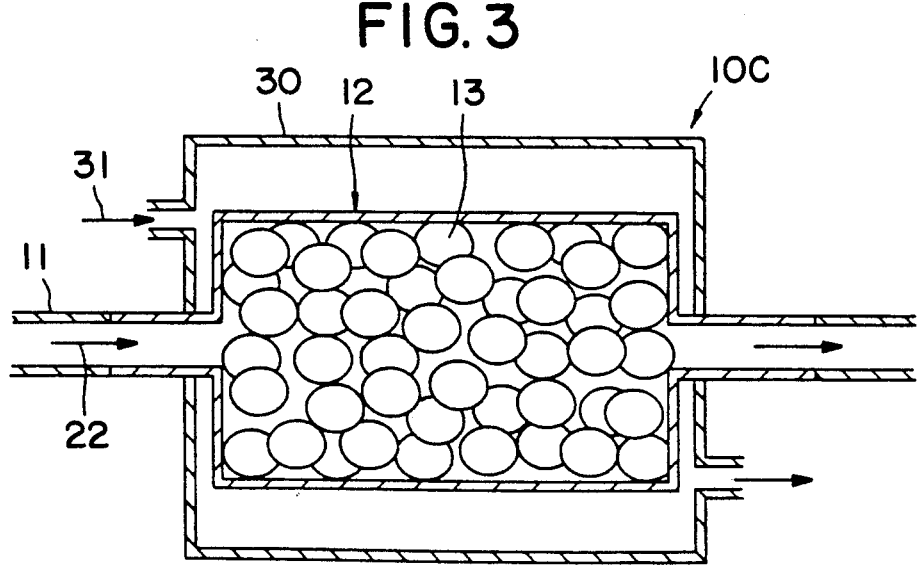

FIG. 3 is a schematic view showing an activation device 10C as another embodiment. As in the case of the above-described activation device 10A, the activation device 10C is also disposed in the fuel pipe 11 and, as heating means, hot water 31 is supplied from a radiator unit into a jacket 30 which covers the outer periphery of the container unit 12 to heat the container unit 12. Other parts are the same as in the above-described activation device 10B. This embodiment uses the hot water 31 from the radiator unit as a heat source of the heating means, however, the present invention is not restricted to this but, alternatively, waste heat from the engine unit 20 may be recirculated.

Figure 4:
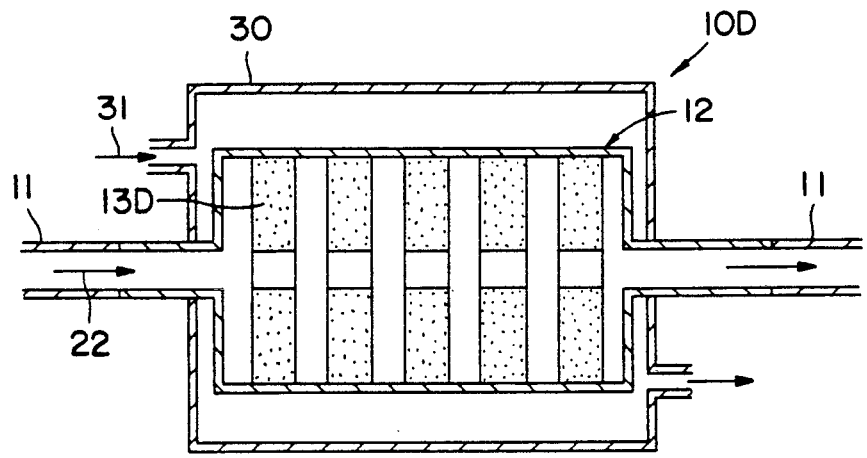

FIG. 4 is a schematic view showing an activation device 10D as another embodiment. As in the case the above-described activation device 10A, the activation device 10D is also disposed in the fuel pipe 11 and, as heating means, uses one which is of the same structure as used in the activation device 10C shown in FIG. 3. A far-infrared-radiant ceramic 13D charged in the container unit 12 has a doughnut-like shape having a center hole. Other shapes of the far-infrared-radiant ceramic 13D than the doughnut-shaped one as used in this embodiment can alternatively be used. For example, the far-infrared-radiant ceramic 13D can be shaped into a honeycomb structure to assure efficient contact with the fuel 22.

Figure 5:
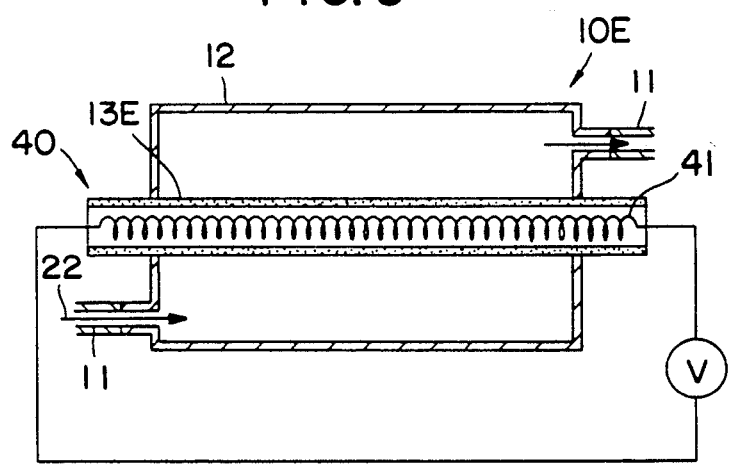

FIG. 5 is a schematic view showing an activation device 10E as another embodiment. As in the case of the activation device 10A shown in FIG. 1, the activation device 10E is disposed in the fuel pipe 11. In the cylindrical container unit 12, a cylindrical pipe 40, which is coated on its outer periphery with powder of a far-infrared-radiant ceramic 13E comprising a metal oxide or the like, is provided in the axial direction. A heater element 41 comprising, for example, a nickel-chromium wire, as heating means is disposed in the cylindrical pipe 40, and the far-infrared-radiant ceramic 13E coated on the cylindrical pipe 40 and the fuel 22 which is passing through are heated by the heater element 41.

Figure 6:
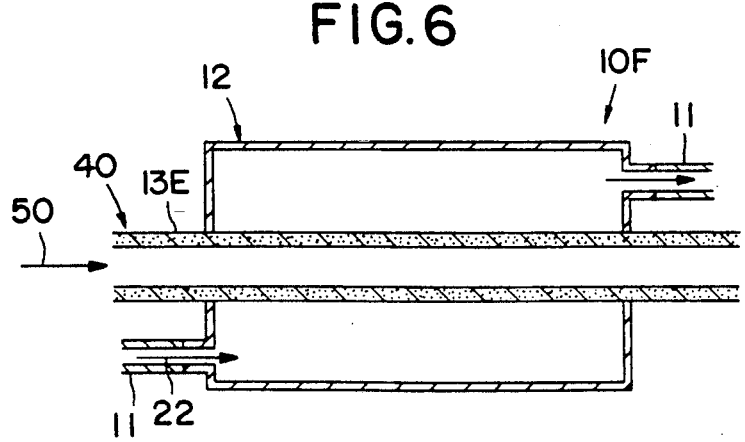

FIG. 6 is a schematic view showing an activation device 10F as another embodiment. The activation device 10F, as in the case of the activation device 10A shown in FIG. 1, is disposed in the fuel pipe 11 and, in place of the heater element 41 shown in FIG. 5, a heating medium 50 utilizing waste heat is passed through the cylindrical pipe 40 coated with the far-infrared-radiant ceramic 13E to heat the far-infrared-radiant ceramic coated on the cylindrical pipe 40 and the fuel 22 which is passing through.

Figure 7:
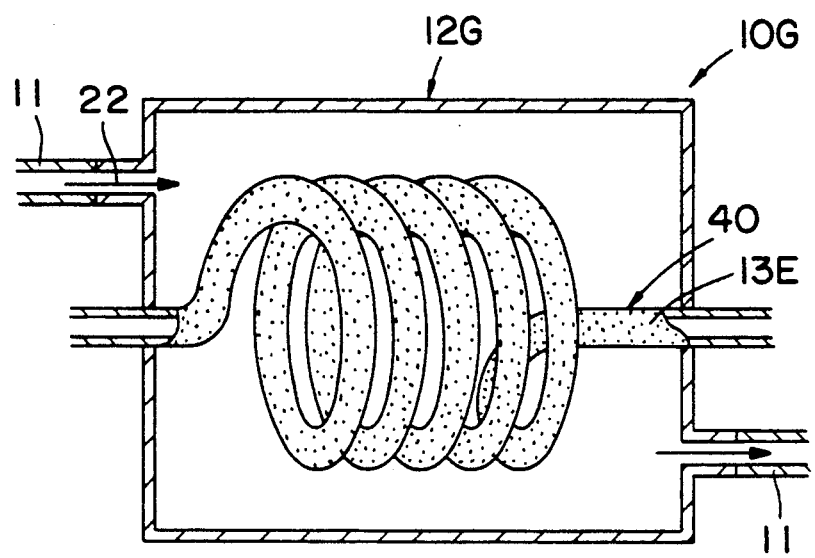

FIG. 7 is a schematic view showing an activation device 10G as another embodiment. The activation device 10G, as in the case of the activation device 10A shown in FIG. 1, is disposed in the fuel pipe 11, and the cylindrical pipe 40 as the heating means used in the activation device 10F is spirally formed in a container unit 12G to increase the surface area of the powder-formed far-infrared-radiant ceramic 13E. Other structure is the same as that of the activation device 10F.

Figure 8:
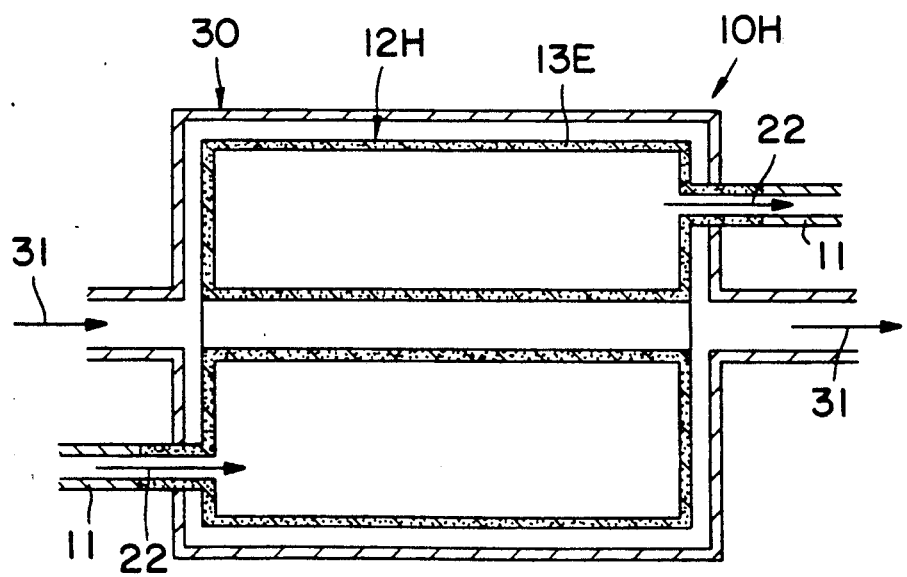

FIG. 8 is a schematic view showing an activation device 10H as another embodiment. As in the case of the activation device 10A shown in FIG. 1, the activation device 10H is disposed in the fuel pipe 11. The inner surface of a container unit 12H is coated with a powder-formed far-infrared-radiant ceramic 13E. The container unit 12H is heated, as in the heating means of the activation device 10C shown in FIG. 3, by supplying hot water 31 from the radiator unit into the jacket 30 covering the outer periphery of the container unit 12H.

TEST EXAMPLES

Test Examples showing the effects of the present invention will now be described. In the Test Examples, the activation devices 10A and 10B were disposed between the carburetor and fuel filter in the engine room of a compact car (1981 model, displacement: 1,500 cc), and tested for CO concentrations (%) and HC concentrations (ppm) of exhaust gas and for mileage. Furthermore, as Comparative Examples, tests were carried out without using the activation devices. Measurement of exhaust gases was made using an exhaust gas tester (WREX-201). Test results are shown in Table 1.

TABLE 1

| | Heating means | CO(%) | HC(ppm) | Mileage (km/l) | Treatment device |
|---|---|---|---|---|---|
| 1 | Used | 1.2–1.3 | 2.7 | 17.1 | Used |
| 2 | Used | 1.3–1.5 | 2.8–3 | 16.4 | Used |
| 3 | Used | 1.3–1.5 | 2.8 | 16.7 | Used |
| 4 | None | 1.8–2 | 2–3.5 | 16.6 | Used |
| 5 | None | 2.2 | 3.3–3.5 | 16.6 | Used |
| 6 | None | 2.0–2.1 | 3.2–3.5 | 16.4 | Used |
| 7 | None | 3.2–3.5 | 4.2–4.5 | 15.6 | None |
| 8 | None | 3.4–3.5 | 4.3 | 15.6 | None |
| 9 | None | 3.2–3.4 | 4.3 | 15.6 | None |

As shown in Table 1, with the activation device according to the present invention, it is found that CO is decreased by about 56% and HC is decreased by about 35%. The mileage is found to be improved 6%. Thus the activation device is found to be stably usable.

As described above, in general, to prevent pollution with exhaust gases, exhaust gas concentration is decreased by improving combustion efficiency of the engine. Use of the activation device according to the present invention further reduces the exhaust gas concentration and improves the mileage.

It was also noted that the activation device according to the present invention could be installed in old-model vehicles to increase the output and decrease mechanical noise. In addition, starting of the engine was very easy even at low temperatures.

We claim:

1. A method of fuel activation comprising contacting said fuel with a functional ceramic emitting no infrared rays other than far infrared rays whereby said fuel is activated before combustion, wherein said fuel contacts said ceramic at a point between a fuel tank and a fuel injector or carburetor, said ceramic being heated to a temperature at least 1° C. higher than the temperature of said fuel before contact with said ceramic and less than the temperature at which substantial vaporization occurs.

2. A fuel activation device comprising a container unit in a fuel pipe introducing fuel into a combustion engine, said container unit being positioned between a fuel tank and a fuel injector or carburetor, a functional ceramic emitting no infrared rays other than in the far infrared region being contained in said unit and adapted to contact said fuel passing through said unit, whereby said fuel is activated, said device further comprising a heater for said ceramic which increases the temperature of said ceramic to a temperature at least 1° C. over the temperature of said fuel prior to contacting said ceramic and less than the temperature at which substantial vaporization takes place.

* * * * *